(12) United States Patent
Mori et al.

(10) Patent No.: US 9,359,229 B2
(45) Date of Patent: Jun. 7, 2016

(54) DEVICE FOR RECOVERING FLOATING MATERIALS ON THE LIQUID SURFACE

(71) Applicant: World Chemical Co., Ltd., Tokyo (JP)

(72) Inventors: Yoji Mori, Tokyo (JP); Yasuichi Haga, Tokyo (JP); Rika Nakajima, Tokyo (JP)

(73) Assignee: WORLD CHEMICAL CO., LTD., Tokyo (JP)

( * ) Notice: Subject to any disclaimer, the term of this patent is extended or adjusted under 35 U.S.C. 154(b) by 188 days.

(21) Appl. No.: 14/284,493

(22) Filed: May 22, 2014

(65) Prior Publication Data

US 2015/0048018 A1 Feb. 19, 2015

(30) Foreign Application Priority Data

Aug. 19, 2013 (JP) ................. 2013-169351

(51) Int. Cl.
| | | |
|---|---|---|
| *B01D 17/032* | (2006.01) | |
| *C02F 1/40* | (2006.01) | |
| *E02B 15/10* | (2006.01) | |
| *B01D 17/02* | (2006.01) | |
| *C02F 101/32* | (2006.01) | |

(52) U.S. Cl.
CPC .............. *C02F 1/40* (2013.01); *B01D 17/0214* (2013.01); *E02B 15/106* (2013.01); *C02F 2101/32* (2013.01)

(58) Field of Classification Search
CPC ......... C02F 1/40; B01D 17/0214; E02B 5/10; E02B 5/106

USPC .......... 210/122, 242.1, 242.3, 523, 524, 540, 210/776, 923
See application file for complete search history.

(56) References Cited

U.S. PATENT DOCUMENTS

| | | | | |
|---|---|---|---|---|
| 3,753,497 A | * | 8/1973 | Hoffman ................ | E02B 15/106 210/242.3 |
| 4,391,707 A | * | 7/1983 | Gordon .................. | E02B 15/105 210/242.3 |
| 5,366,629 A | * | 11/1994 | Mori ...................... | E02B 15/106 210/242.3 |
| 6,120,681 A | * | 9/2000 | Heo ........................ | E02B 15/106 210/242.3 |
| 6,277,273 B1 | * | 8/2001 | Gore ................... | B01D 17/0214 210/242.1 |
| 8,911,618 B2 | * | 12/2014 | Kubo ................. | B01D 17/0214 210/242.3 |

FOREIGN PATENT DOCUMENTS

JP 2012-239951 * 12/2012

* cited by examiner

*Primary Examiner* — Christopher Upton
(74) *Attorney, Agent, or Firm* — Wenderoth, Lind & Ponack, L.L.P.

(57) ABSTRACT

A device has a gate portion for recovering floating materials on liquid surfaces and for following vertical movement of the liquid level. Gate floats around and rotatable about the gate portion retain the gate portion near the liquid level. Main floats outside the gate floats support a recovery portion. A blade-shaped projection on an outer circumferential part will rotate along the liquid level. A driving device rotates the gate float, with loads of the driving device being supported by the main floats.

5 Claims, 4 Drawing Sheets

PRIOR ART

DEVICE FOR RECOVERING FLOATING MATERIALS ON THE LIQUID SURFACE

FIELD OF THE INVENTION

The present invention relates to a device for recovering floating materials on the liquid surface and, more particularly, to a recovering device for floating materials such as scum and oil floating on a liquid surface of each of various treatment tanks installed at a paint plant, a food factory, a steel works, a thermal power plant, a seafood processing plant, a machine factory, etc.

BACKGROUND OF THE INVENTION

As the device for recovering floating materials on the liquid surface, an arrangement based on a technique has been known in which a double float-type arrangement having not only a main float for floating and supporting a recovery device main body but also a gate float for retaining a gate portion is used, that is, an inflow hole of floating materials near a liquid surface, thereby attaining efficient recovery of floating materials floating on the liquid surface by allowing the floating materials to flow in and/or sucking them, etc.

In order to efficiently and reliably recover floating materials floating on the liquid surface such as scum and oil, it is desirable that the gate portion which is an inflow hole part of a recovery portion is always in a state of following the liquid surface.

a device for recovering floating materials on the liquid surface and

Where floating materials on the liquid surface are relatively small in diameter, they flow in the gate portion smoothly. However, where the floating materials are those of several millimeters or larger in diameter, they may be caught at a marginal part of the gate portion and cannot be recovered. And, if the gate portion is further lowered than a liquid level, the liquid-level floating materials are recovered in a greater quantity but at the same time water flows in a larger quantity. Thus, it is necessary to install a larger-capacity separator which separates the thus recovered scum and oil from water. This poses a problem.

Therefore, such a technique has been proposed that has a raking/gathering arrangement so that floating materials on the liquid surface flow in a gate portion efficiently by disposing a rotary blade-like raking/gathering unit around the gate portion or in the vicinity thereof, thereby allowing more floating materials on the liquid surface to flow in the gate portion without unnecessarily lowering the gate portion from the liquid surface (liquid level), (refer to Patent Document 1, for example).

Patent Document 1: Japan Patent Pre-Publication No. 2012-239951

SUMMARY OF THE INVENTION

The technique disclosed in Patent Document 1 is arranged in such a manner that the gate portion is installed at an upper portion of the gate float positioned below a liquid level and a plurality of rod-shaped raking/gathering blades are rotated around the gate portion by a driving source which is a drive motor disposed above the gate portion, thereby floating materials on the liquid surface are raked-up and gathered at the gate portion to recover them efficiently.

According to the technique disclosed in Patent Document 1, floating oil low in viscosity and floating oil low in impurity content, etc., may be recovered without any problems. However, in recovering liquid-level floating materials which are likely to flock and easily aggregate such as floating scum, floating oil high in viscosity, waste oil and wastewater high in impurity content, etc., this technique is lower in raking/gathering performance and lower in recovery performance because the liquid-level floating materials in an aggregate form are easily caught at a marginal part of the gate portion. This poses a problem.

Further, in the course where the liquid-level floating materials which are likely to flock and easily aggregate are allowed to float and move to the gate portion on recovery, and when they come close to or float up to a position in contact with a plurality of main floats disposed outside the gate portion, for example, as shown in FIG. 4, in a state of bridging between individual main floats, these liquid-level floating materials are likely to flock in a bridged shape and the bridge-shaped flock of these liquid-level floating materials stay at the same place and grow without moving up to the gate portion, thus developing into an unrecoverable state. This poses another problem.

SUMMARY OF THE INVENTION

Therefore, an object of the present invention is to provide a device for recovering floating materials on the liquid surface which is capable of recovering reliably and efficiently even floating materials on the liquid surface such as scum and oil which are likely to flock and easily aggregate.

The present invention for solving the above-described problems has the following arrangement.

1. A device for recovering floating materials on the liquid surface including a float which is disposed inside a liquid layer where scum and oil are mixed and float, a recovery portion which recovers floating materials on the liquid surface which contain scum and oil floating on the liquid surface by a buoyant force of the float from a gate portion retained near the surface of the liquid layer, and a recovery pipe which is connected to the recovery portion, the device for recovering floating materials on the liquid surface wherein the gate portion is installed at the recovery portion in a state capable of moving freely in a vertical direction and following vertical movement of the liquid level, the float is arranged with a plurality of gate floats which are disposed around and in the vicinity of the gate portion to float and support the gate portion, thereby retaining the gate portion near the liquid level, and a plurality of main floats which are disposed further outside than the plurality of gate floats to float and support the recovery portion and the recovery pipe connected to the recovery portion, the plurality of gate floats are arranged so as to rotate around and in the vicinity of the gate portion, thereby raking/gathering to the gate portion liquid-level floating materials which come close to or float at a position in contact with the gate float, and each of the plurality of main floats is provided at an outer circumferential part in contact with the liquid level with one or a plurality of blade-like projections, and at least a part where the blade-like projection is installed is arranged to move rotationally or rotate along the liquid level, thereby crushing, separating and cleaving floating materials coming close to or floating at a position in contact with the main float, and providing with a driving device such as a motor for rotating the gate float and in which loads of the driving device are arranged to be supported by the main float.

2. The device for recovering floating materials on the liquid surface according to the above description of 1, in which each of the plurality of main floats is positioned so as to be lower than the liquid level, thereby realizing a vertical two-stage arrangement composed of a lower portion main float which mainly receives a buoyant force below the liquid level and an upper portion main float which mainly receives a buoyant force at the liquid level part by projecting partially above the liquid level, and the blade-like projection is arranged so as to be installed at an outer circumferential portion of the upper portion main float.

3. The device for recovering floating materials on the liquid surface according to any one of the above descriptions of 1 or 2 is arranged in such a manner that upon rotation of the gate float, at least a part of the gate float is in contact with the main float, thereby allowing the main float to move rotationally or rotate.

4. The device for recovering floating materials on the liquid surface according to any one of the above descriptions of 1 to 3 is arranged in such a manner that with regard to scum and oil-containing liquid-level floating materials which are to be led to the outside of the liquid layer through the recovery pipe, a separator which separates and recovers scum and oil from water is connected to the recovery pipe.

5. The device for recovering floating materials on the liquid surface according to the above description of 4 is arranged in such a manner that the scum and oil-containing liquid-level floating materials which have been recovered through the recovery pipe from the gate portion are sent out to the separator by a pump disposed at the recovery portion.

According to the invention described in the above 1, it is possible to provide a device for recovering floating materials on the liquid surface which is capable of recovering reliably and efficiently even floating materials on the liquid surface such as scum and oil which are likely to flock and easily aggregate.

In particular, by such an arrangement that the plurality of gate floats disposed around and in the vicinity of the gate portion have raking/gathering functions, rotation of a constituent having the capacity as a floating body makes it possible to rake and gather floating materials on the liquid surface to the gate portion more effectively than the use of a simple rod-shaped raking/gathering blade. Further, the gate portion is retained near the liquid level, by which the floating and supporting gate float is retained at a position with respect to the liquid level together with the gate portion in a substantially constant manner. Therefore, the liquid level as well as effects and efficiency for raking and gathering the floating materials on the liquid surface are retained so as to be substantially constant. As a result, it is possible to obtain stable raking/gathering effects.

Further, by such an arrangement that the main float having the blade-like projection moves rotationally or rotates along the liquid level, even where floating materials on the liquid surface which are likely to flock and easily aggregate come close to or float up to a position in contact with the main float, the floating materials are crushed, separated and cleaved by the blade-like projection at a part of the main float disposed outside the gate portion and the gate float. Thus, it is possible to prevent effectively floating materials on the liquid surface from flocking and staying at the same place. Therefore, even the floating materials on the liquid surface which are likely to flock and easily aggregate are allowed to be recovered from the gate portion reliably and efficiently.

The floating materials on the liquid surface are crushed, separated and cleaved at this main float part and the floating materials on the liquid surface are raked and gathered at the previously described gate float part, thereby generating synergetic effects. Then, even the floating materials on the liquid surface such as scum and oil which are likely to flock and easily aggregate are reliably suppressed from being bridged between the main floats and flocking. It is, thus, possible to recover the floating materials on the liquid surface reliably and efficiently.

According to the invention described in the above 2, the main float is arranged so as to give a vertical two stage. And, this arrangement makes it easy to adjust floating height with respect to the liquid level. In particular, when the blade-like projection installed at the upper portion main float moves rotationally or rotates, the blade-like projection is allowed to be in contact with the liquid level in a stable state. Further, it is possible to set an opening upper face position of the gate portion at a desired position in a stable state by using the upper portion main float which projects above the liquid level.

According to the invention described in the above 3, by such an arrangement that loads of the driving device for rotating the gate float are to be received not by the gate float but by the main float, the gate float is able to easily retain the gate portion near the liquid level.

According to the invention described in the above 4, a necessity for a special driving device for allowing the main float to move rotationally or rotate is eliminated.

According to the invention described in the above 5, it is possible to swiftly send out to the separator the recovered floating materials on the liquid surface which contain scum and oil.

According to the invention, by a pump preferably being disposed at the recovery portion which is supported with a buoyant force by the main float, it is possible to actuate the pump at a position quite close to the gate portion. It is, thus, possible to attain efficient recovery. As a result, this arrangement makes it possible to downsize and simplify the pump as compared with an arrangement in which the pump is disposed outside the liquid layer.

DETAILED DESCRIPTION OF THE PREFERRED EMBODIMENT(S)

Next, a detailed description will be given of the present invention with reference to attached drawings.

A device for recovering floating materials on the liquid surface of the present invention (may hereinafter be referred to simply as the recovery device) is a device for recovering liquid-level floating materials such as floating scum of wastewater resulting from a paint plant and a painting process, floating scum and oil inside a liquid layer in a food factory, etc. (for example, butter, margarine, edible fats, cheese, etc.), spilled oil such as crude oil, scum in a sewage treatment plant, coolant oil of a machining center, floating oil in a degreasing process in plating, grease in a repair and maintenance factory, etc., scum, oil, etc., floating on the liquid surface (liquid level) of each of various types of treatment tanks in a steel works, a thermal power plant, a seafood processing plant, a machine factory, etc. The device may further include a device for separating recovered scum and oil from water, whenever necessary.

Figure 1:
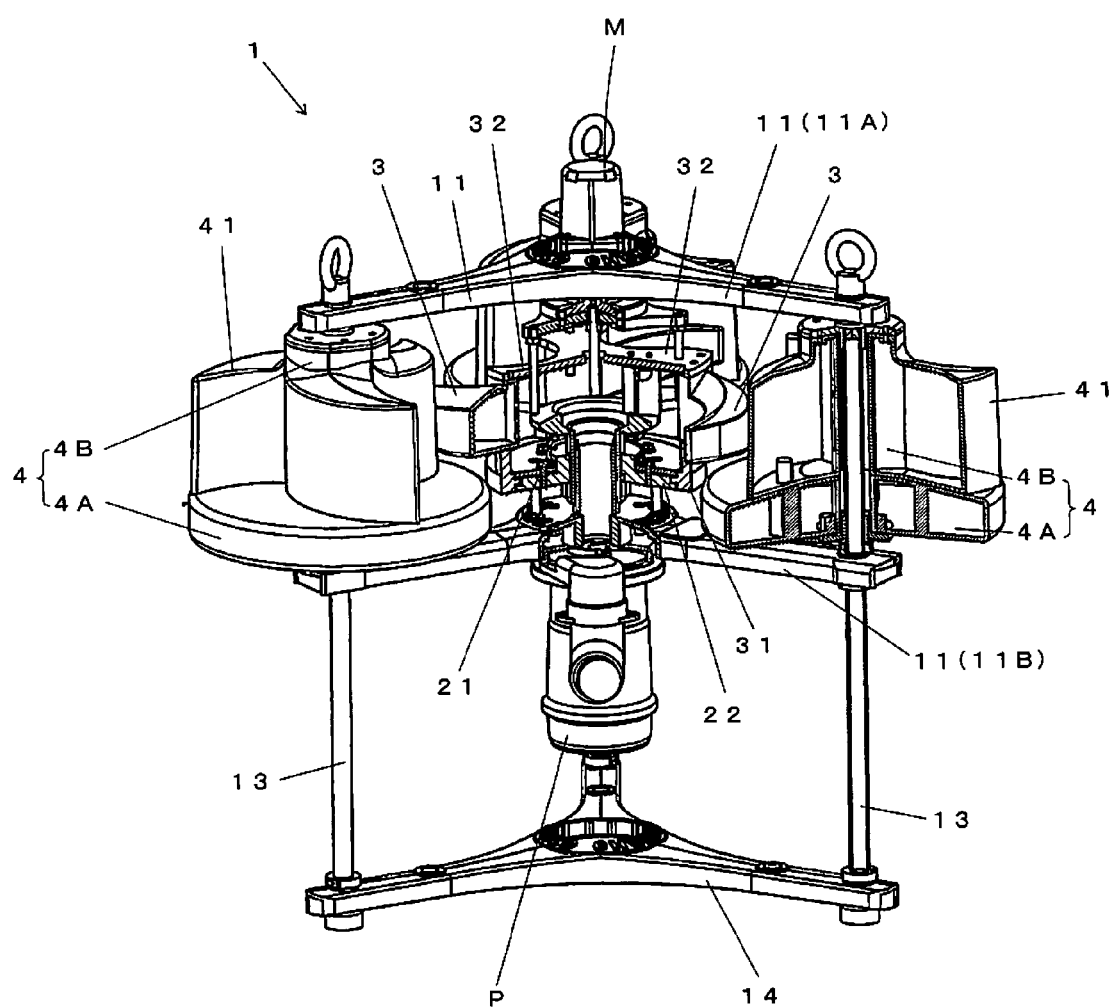
FIG. 1 is a partially-broken schematic perspective view which shows a device for recovering floating materials on the liquid surface of the present invention.
Figure 2:
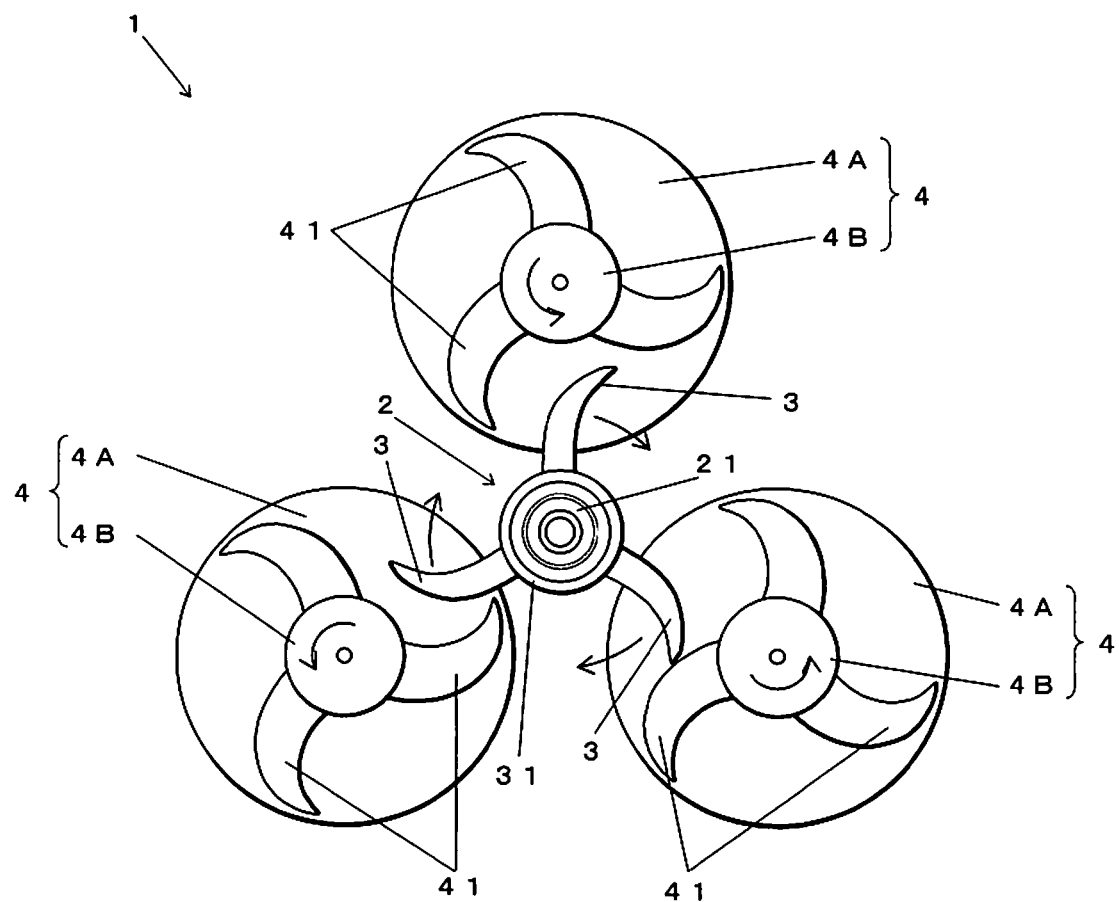
FIG. 2 is a schematic plan view which shows an arrangement of a gate portion, gate floats, main floats and blade-like projections.
Figure 3:
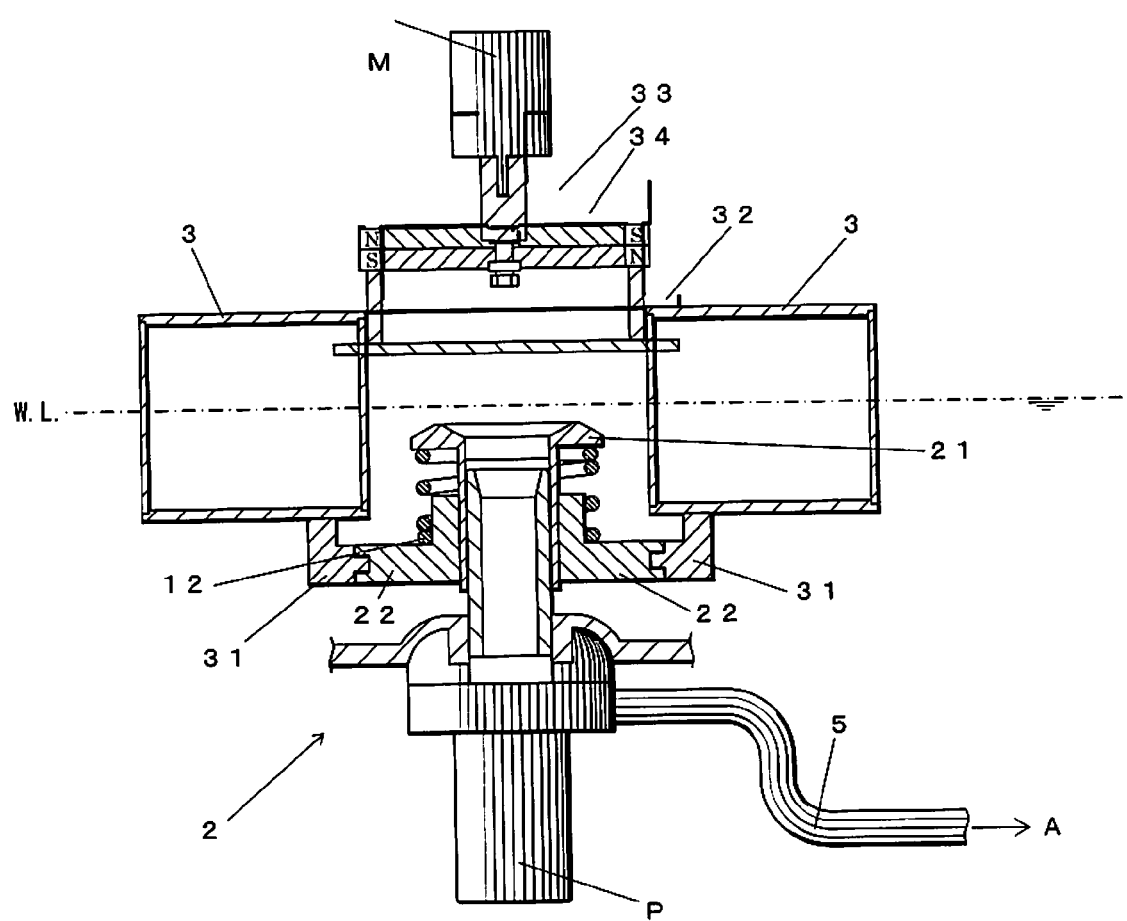
FIG. 3 is a schematic sectional view which shows an arrangement of a recovery portion, the gate portion, the gate float and a driving device.
Figure 4:
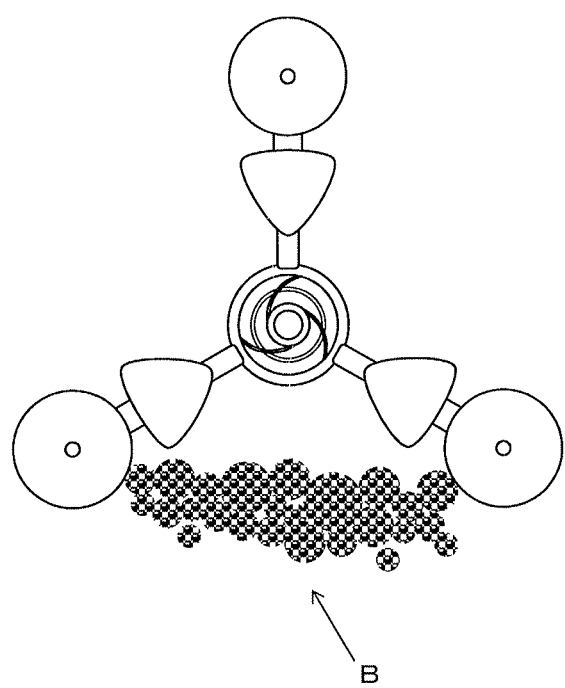
FIG. 4 is a schematic plan view which illustrates a conventional device.

In a specific arrangement, for example, an example shown in FIG. 1 to FIG. 3, is arranged so as to include floats (3, 4) disposed inside a liquid layer in which scum and oil are mixed and float, a recovery portion 2 which recovers liquid-level floating materials containing scum and oil floating on the liquid level from a gate portion 21 which is retained near the liquid level of the liquid layer by a buoyant force of each of the floats (3, 4) and a recovery pipe 5 which is connected to the recovery portion 2, and this is a device for recovering floating materials on the liquid surface 1 which is used in separating from water and recovering scum and oil recovered via the recovery pipe 5 from the gate portion 21 by a separator (not illustrated) mounted outside the liquid layer, in which the gate portion 21 is installed at the recovery portion 2 in a state of following vertical movement of the liquid level and being able to move freely in a vertical direction, the floats (3, 4) have a so-called double float arrangement made up of a plurality of gate floats 3 (three in the present example) which are disposed around and in the vicinity of the gate portion 21, floating and supporting the gate portion 21 to retain the gate portion 21 near the liquid level, and a plurality of main floats 4 (three in the present example) which are disposed further outside than the plurality of gate floats 3, floating and supporting the recovery device 1 in its entirety including the recovery portion 2, the recovery pipe 5 connected to the recovery portion 2, etc., the plurality of gate floats 3 are arranged to rotate around and in the vicinity of the gate portion 21, thereby raking and gathering to the gate portion 21 floating materials on the liquid surface which come close to or float at a position in contact with the gate float 3, and each of the plurality of main floats 4 is arranged to have one or a plurality of blade-like projections 41 on an outer circumferential part in contact with the liquid level and at least a part where the blade-like projection 41 is installed moves rotationally or rotates along the liquid level, thereby crushing, separating and cleaving the liquid-level floating materials which come close to or float at a position in contact with the main float 4.

Next, a description will be given of individual components with reference to the example.

As shown in FIG. 3, the recovery portion 2 is arranged in such a manner that the recovery pipe 5 is connected below the liquid level, by which floating materials on the liquid surface recovered from the gate portion 21 and a liquid such as water sucked together with the floating materials on the liquid surface are sent out to a separator mounted outside a liquid layer. It is desirable that a pump P for sucking and recovering the floating materials on the liquid surface and the liquid and sending them out is disposed at the recovery portion 2. In the present example, the pump P is arranged so as to be an underwater pump which is disposed at a lower portion of the recovery portion 2. It is noted that the pump P may be arranged so as to be disposed not at the recovery portion 2 but at any of a starting end part, an intermediate part and a terminal end part of the recovery pipe 5. Alternatively, a self-priming pump P or the like may be arranged so as to be built-in or annexed to a separator outside the liquid layer. It is also desirable that the recovery pipe 5 is connected with respect to the recovery portion 2 so as to be able to change in angles via a free joint mechanism.

Further, the gate portion 21 disposed at the recovery portion 2 is arranged to be connected with respect to the recovery portion 2 in a state of being able to move freely in a vertical direction. And, the gate portion 21 is floated and supported at an outer circumferential portion of the gate portion 21 by the gate float 3 via floating and supporting portions 22, 31.

It is noted that the gate portion 21 may be arranged so as to have a radial fin-shaped introduction fin portion on an opening upper face thereof, depending on types of liquid-level floating materials to be recovered. In such an arrangement, the floating materials on the liquid surface and liquids to be recovered from the gate portion 21 into the recovery portion 2 flow, following the shape of the introduction fin portion to give a vortex-like rotating flow. Therefore, by forming an exhaust hole at the center of liquid flowing-in in a rotating manner, a part to which the rotating flow enters can be prevented from being blocked by the liquid. It is also possible to prevent air from entering the pump P. As a result, it is possible to prevent pulsation when the liquid flows in and to recover the liquid-level floating materials to be recovered more efficiently, depending on types thereof.

As shown in FIG. 3, the floating and supporting portion 22 on the side of the gate portion 21 and the floating and supporting portion 31 on the side of the gate float 3 are arranged so as to be recessed and raised respectively. In the vertical direction, a recessed portion is engaged with a raised portion, thereby allowing the gate portion 21 to correspond to a vertical change in a liquid level together with the gate float 3 following a vertical change in the liquid surface (liquid level), while maintaining a state of being connected. Also, due to the above recessed/raised arrangement, the recessed portion is kept engaged with the raised portion and allowed to move freely in a horizontal direction, by which the gate float 3 is able to rotate around, with respect to the gate portion 21. It is noted that the gate portion 21 is arranged to be fixed with respect to a rotational direction so that it will not rotate together with the gate float 3 which is able to rotate. Such an arrangement prevents the liquid-level floating materials recovered from the gate portion 21 from rotating together with the gate float 3. The gate portion 21 can be fixed with respect to the floating and supporting portion 22 so as to be retained at an appropriate height near the liquid level via a gate portion height retaining member 12 such as a spring member, a screw member or other fixing unit (the spring member is used in the present example (refer to FIG. 3)).

As described above, the gate float 3 is to float and support the gate portion 21 of the recovery portion 2 so as to retain the gate portion 21 near a liquid level. A distance between the liquid level to the opening upper face of the gate portion 21 retained below the liquid level will vary depending on various conditions, such as types, viscosity, etc., of floating materials on the liquid surface to be recovered. For example, however, in a case of floating materials on the liquid surface which will float not only on the liquid level but also in a state that more than half a thickness thereof is submerged below the liquid level such as floating scum in paint wastewater from a paint plant and floating scum in a food factory, the distance is from about 5 mm to 30 mm and preferably from about 10 mm to 20 mm, and more preferably about 15 mm. It is noted that in a case of recovering a floating material on the liquid level, the thickness of which is greater than the distance between the liquid level to the opening upper face of the gate portion 21, for example, thick floating scum, the material can be recovered in total by raking and gathering it continuously and repeatedly a number of times, although the material cannot be recovered in total at the gate float 3 by raking and gathering it at one time.

As the gate float 3, any known and publicly used arrangement of a float body can be employed for a float body used in this type of device for recovering liquid-level floating materials without any special restriction (in terms of a material, buoyant force configuration, shape, etc.). It is preferable that the gate float 3 is formed with, for example, a foamed resin or a hollow resin mold (hollow resin mold in the present example (refer to FIG. 1)). Further, the shape of the gate float 3 includes any known and publicly used float shape. And, the gate float 3 may be formed so that floating materials can be raked and gathered or so as to scoop them, for example, in a paddle shape, a bent shape or a curved shape. In the present example, the gate float 3 is arranged to easily rake and gather liquid-level floating materials in a direction of the gate portion 21 located at the center, by being formed in the shape of a circular arc when viewed from above.

An arrangement in which the gate float 3 is allowed to rotate around and in the vicinity of the gate portion 21 includes that in which the gate float 3 is rotated and driven via a supporting arm portion 32 by a driving device M such as a motor which is above the recovery portion 2 and supported under loads on the main float 4 via a device main body supporting arrangement portion 11 (in particular, a part 11A positioned on the upper portion side).

It is noted that in the present example, rotation/connection portions 33, 34 connected in a stacked state are arranged so as to be present between the driving device M and the supporting arm portion 32. Each of the stacked rotation/connection portions 33, 34 is arranged to be a circular disk-shaped plate which assumes a circle when viewed from above. The rotation/connection portion 33 on the upper side rotates by being connected to the driving device M, while the rotation/connection portion 34 on the lower side rotates in synchronization with rotation of the rotation/connection portion 33, thereby allowing the gate float 3 to rotate via the supporting arm portion 32.

It is preferable that the rotation/connection portion 33 on the upper side is connected to the rotation/connection portion 34 on the lower side by means of a so-called magnet coupling arrangement. This is such that one or a plurality of magnet bodies are disposed at each of the rotation/connection portions and the portions rotate in synchronization by being sucked and connected due to a magnetic force between these magnet bodies. The arrangement in which the rotation/connection portions rotate in synchronization by being sucked and connected due to a magnetic force between the magnet bodies makes it possible to suppress or prevent seizing or breakage of the motor of the driving device M or breakage of other components such as the supporting arm portion 32 due to the fact that they are released from being sucked or connected in a case, for example, where the guide float 3 is inhibited from rotation and stopped by foreign matter other than scum and oil (for example, gloves and various types of tools having a buoyant force used in a factory, etc.) or floating materials such as solids which are caught at the guide float 3, etc. That is, where loads which may stop the guide float 3 exceed a magnetic force of the magnet bodies, the rotation/connection portion 33 and the rotation/connection portion 34 are arranged so as to be released from being sucked or connected in a direction at which they rotate in synchronization, and the rotation/connection portion 33 on the upper side rotates loosely, thereby suppressing or preventing the driving device M, etc., from being damaged. Then, at a point in time when the loads are removed, etc., by which these loads become lower than a magnetic force between the magnet bodies, the rotation/connection portion 34 on the lower side is again sucked and connected to the rotation/connection portion 33 on the upper side, thereby again starting to rotate in synchronization by the magnetic force.

Each of the main floats 4 is a vertical two stage arrangement made up of a lower portion main float 4A which is positioned below the liquid level to mainly receive a buoyant force below the liquid level and an upper portion main float 4B which at least partially projects above the liquid level to mainly receive a buoyant force on the liquid level. And, each main float 4 is arranged in such a manner that the blade-like projection 41 is installed at an outer circumferential portion of the upper portion main float 4B.

The main float 4 is given as a vertical two stage arrangement, thus making it possible to easily adjust a floating height with respect to the liquid level. In particular, where the blade-like projection 41 of the upper portion main float 4B moves rotationally or rotates, the blade-like projection 41 is allowed to be stably in contact with the liquid level. Therefore, liquid-level floating materials floating to the main float 4 part can be reliably and efficiently crushed, separated and cleaved. As a result, even floating materials on the liquid surface such as scum and oil which are likely to flock and easily aggregate can be reliably prevented from being bridged between the main floats 4, 4 and flock. Therefore, it is possible to recover the floating materials on the liquid surface reliably and efficiently. In particular, the upper portion main float 4B which projects above the liquid level can be used to set the opening upper face position of the gate portion 21 at any desired position in a stable state.

As the main float 4, any known and publicly used arrangement of a float body can be employed for a float body of this type of the device for recovering floating materials on the liquid surface without any particular restriction (in terms of a material, buoyant force configuration, shape, etc.). It is preferable that the main float 4 is formed with, for example, a foamed resin or a hollow resin mold (hollow resin mold in the present example (refer to FIG. 1)). Further, regarding the shape of the main float 4, the lower portion main float 4A includes any known and publicly used float shape. It is preferable that the upper portion main float 4B is formed in the shape so as to efficiently move rotationally or efficiently rotate. It is in particular preferable that the center portion thereof is in a cylindrical shape. Still further, it is preferable that the lower portion main float 4A modulates and adjusts a buoyant force by changing its shape and size, depending on the weight of a component to be floated and supported, in particular, depending on the weight of the pump P. The pump P is arranged so as to be disposed not at the recovery portion 2 but outside the liquid layer, by which the main float 4 is allowed to be much lower in buoyant force. Thus, it is acceptable that the lower portion main float 4A is downsized to give a small buoyant force or the lower portion main float 4A is removed or omitted.

The lower portion main float 4A and the upper portion main float 4B are arranged in such a manner that they are both installed between the device main body supporting arrangement portions 11 of the recovery device 1, that is, 11A and 11B, so as to move rotationally or rotate. A device main body supporting base portion 13 is installed below the lower portion main float 4A. When a quantity of liquid inside the liquid layer is less than a lower limit value of a recoverable quantity by the recovery device 1, that is, when the liquid level is positioned below the gate portion 21, or when the recovery device 1 is brought outside the liquid layer, the recovery device 1 is allowed to stand by itself on a bottom of the liquid layer, a floor, etc. It is noted that in the present example, a base portion frame is added for securing the strength of the device main body supporting base portion 13.

The blade-like projection 41 installed at the upper portion main float 4B may include a plurality of simple plate-shaped bodies which are disposed in a radial manner. It is, however, preferable that the blade-like projection 41 is formed in the shape of being able to rake and gather floating materials so as to scoop them, for example, in a paddle shape, a bent shape or a curved shape. In the present example, the blade-like projection 41 is arranged so as to crush, separate and segmentalize floating materials on the liquid surface which flock and also to easily rake and gather them by being formed in the shape of a circular arc when viewed from above.

Rotational movement or rotation of the main float 4 is attained by such an arrangement that each of the plurality of main floats 4 is provided with a driving device such as a motor acting as a driving source or such an arrangement that at least one of the plurality of main floats 4 is provided with a driving device such as a motor acting as a driving source and the other main floats 4 are allowed to move rotationally or rotate via a power transmitting mechanism such as a chain-driving mechanism or a belt-driving mechanism. Preferable is such a mechanism that on rotation of the gate float 3, at least a part of the gate float 3 is in contact with the main float 4, thereby allowing the main float 4 to move rotationally or rotate. In this case, the part with which the gate float 3 is in contact is preferably the blade-like projection 41 which is installed at an outer circumferential portion of the upper portion main float 4B. According to the above-described arrangement, it is possible to use the driving device M such as a motor in a consolidated manner for only one of the gate floats 3 as an available driving source. Further, the driving device M which is a relatively heavy product is disposed at the center portion of the recovery device 1, thus making it possible to easily optimize weight balance when floating up.

According to the above-arranged recovery device 1 of the present invention, it is possible to recover scum in a state of floating on a liquid level and being submerged below the liquid level, in addition to oil floating on the liquid level reliably and efficiently.

In particular, an arrangement in which the plurality of gate floats 3 rotating around and in the vicinity of the gate portion 21 are used to rake and gather liquid-level floating materials to the gate portion 21 is able to retain the gate portion 21 near the liquid level and able to keep substantially constant a position of each of the gate floats 3 itself with respect to the liquid level. Therefore, the liquid level as well as effects and efficiency for raking and gathering the floating materials on the liquid surface are retained so as to be substantially constant. As a result, it is possible to obtain stable raking/gathering effects.

Further, due to rotational movement or rotation of the main float 4 (4B) having the blade-like projection 41 on its outer circumference, even liquid-level floating materials which are likely to flock and easily aggregate are crushed, separated and segmentalized. Therefore, it is possible to effectively prevent the liquid-level floating materials from flocking and staying at the same place. As a result, it is possible to reliably suppress the floating materials from being bridged between the plurality of main floats 4, 4 and flocking and recover them reliably and efficiently.

Still further, according to the recovery device 1 of the present invention, the floating materials on the liquid surface are crushed, separated and cleaved by the blade-like projection 41 of the above-described main float 4 (4B) and raked and gathered by the gate floats 3 to produce synergetic effects. Thereby, the liquid-level floating materials are recovered not only at a higher efficiency than a conventional recovery device but also scum, the recovery of which was difficult or not possible by using the conventional recovery device, can be recovered.

As described above, the floating materials on the liquid surface which have been recovered by the above-described arrangement are sent out via the recovery pipe 5 to a separator at which scum and oil are separated from water. It is noted that as the separator, any known and publicly used arrangement for a separator may be used for this type of the recovery device for floating materials on the liquid surface and any other oil-water separator without any special restriction.

It is noted that the pump P which sucks and recovers floating materials on the liquid surface and liquids to send them out may be disposed at any site, as described previously. However, an underwater pump disposed at a lower portion of the recovery portion 2 is preferable, where the separator is disposed near the pump.

DESCRIPTION OF THE SYMBOLS

1: Device for recovering floating materials on the liquid surface
11 (11A, 11B): Device main body supporting arrangement portion
12: Gate portion height retaining member
13: Device main body supporting base portion
14: Base portion frame
2: Recovery portion
21: Gate portion
22: Floating and supporting portion
23: Introduction fin portion
3: Gate float
31: Floating and supporting portion
32: Supporting arm portion
33, 34: Rotation/connection portion
4: Main float
4A: Lower portion main float
4B: Upper portion main float
41: Blade-like projection
5: Recovery pipe
M: Driving device
P: Pump
A: Separator
B: Bridged scum

What is claimed is:
1. A device for recovering floating materials on the liquid surface including
   a float which is disposed inside a liquid layer where scum and oil are mixed and float, a recovery portion which
   recovers floating materials on the liquid surface which contain scum and oil floating on the liquid surface by a buoyant force of the float from a gate portion retained near the surface of the liquid layer, and a recovery pipe which is connected to the recovery portion,
   the device for recovering floating materials on the liquid surface wherein
   the gate portion is installed at the recovery portion in a state capable of moving freely in a vertical direction and following vertical movement of the liquid level,
   the float is arranged with a plurality of gate floats which are disposed around and in the vicinity of the gate portion to float and support the gate portion, thereby retaining the gate portion near the liquid level, and a plurality of main floats which are disposed further outside than the plurality of gate floats to float and support the recovery portion and the recovery pipe connected to the recovery portion, the plurality of gate floats are arranged so as to rotate around and in the vicinity of the gate portion, thereby raking/gathering to the gate portion liquid-level floating materials which come close to or float at a position in contact with the gate float, and each of the plurality of main floats is provided at an outer circumferential part in contact with the liquid level with one or a plurality of blade-like projections, and at least a part where the blade-like projection is installed is arranged to move rotationally or rotate along the liquid level, thereby crushing, separating and cleaving floating materials coming close to or floating at a position in contact with the main float, and providing with a driving device such as a motor for rotating the gate float and in which loads of the driving device are arranged to be supported by the main float.

2. The device for recovering floating materials on the liquid surface according to claim 1, in which each of the plurality of main floats is positioned so as to be lower than the liquid level, thereby realizing a vertical two-stage arrangement composed of a lower portion main float which mainly receives a buoyant force below the liquid level and an upper portion main float which mainly receives a buoyant force at the liquid level part by projecting partially above the liquid level, and the blade-like projection is arranged so as to be installed at an outer circumferential portion of the upper portion main float.

3. The device for recovering floating materials on the liquid surface according to claim 1 is arranged in such a manner that upon rotation of the gate float, at least a part of the gate float is in contact with the main float, thereby allowing the main float to move rotationally or rotate.

4. The device for recovering floating materials on the liquid surface according to claim 1 is arranged in such a manner that with regard to scum and oil-containing liquid-level floating materials which are to be led to the outside of the liquid layer through the recovery pipe, a separator which separates and recovers scum and oil from water is connected to the recovery pipe.

5. The device for recovering floating materials on the liquid surface according to claim 4 is arranged in such a manner that the scum and oil-containing liquid-level floating materials which have been recovered through the recovery pipe from the gate portion are sent out to the separator by a pump disposed at the recovery portion.

* * * * *